(12) United States Patent
Okamoto et al.

(10) Patent No.: US 7,147,971 B2
(45) Date of Patent: Dec. 12, 2006

(54) ELECTRODE FOR RECHARGEABLE LITHIUM BATTERY AND RECHARGEABLE LITHIUM BATTERY

(75) Inventors: Takashi Okamoto, Gunma (JP); Hiroyuki Fujimoto, Kobe (JP); Toyoki Fujihara, Kobe (JP); Masahiro Iyori, Hirakata (JP); Maruo Kamino, Kobe (JP); Shigeki Matsuta, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 164 days.

(21) Appl. No.: 10/124,712

(22) Filed: Apr. 18, 2002

(65) Prior Publication Data

US 2003/0027050 A1 Feb. 6, 2003

(30) Foreign Application Priority Data

Apr. 19, 2001 (JP) ............................. 2001-121172
Apr. 23, 2001 (JP) ............................. 2001-124509

(51) Int. Cl.
*H01M 4/66* (2006.01)
(52) U.S. Cl. .................... 429/245; 429/218.1; 429/209
(58) Field of Classification Search ................ 429/245, 429/233, 236, 231.95, 209, 128, 131; 204/280, 204/288.2, 290.01, 293; 427/58, 126.1; 420/469, 420/485, 490; 428/548, 561
See application file for complete search history.

(56) References Cited

U.S. PATENT DOCUMENTS 6,730,434 B1 * 5/2004 Kawakami et al. ...... 429/218.1

FOREIGN PATENT DOCUMENTS

| EP | 0910131 | * | 4/1999 |
| JP | 10-255768 A | | 9/1998 |
| JP | 10-294098 | * | 11/1998 |
| JP | 2000-215897 | * | 8/2000 |
| WO | WO 00/17949 | * | 3/2000 |
| WO | 01/31720 A1 | | 3/2001 |

OTHER PUBLICATIONS

Huggins, Robert A; "Lithium alloy negative electrodes formed from convertible oxides"; *Solid State Ionics 113-115*; pp. 57-67; 1998.

* cited by examiner

*Primary Examiner*—Raymond Alejandro
(74) *Attorney, Agent, or Firm*—Kubovcik & Kubovcik

(57) ABSTRACT

In an electrode for a rechargeable lithium battery which includes a current collector and a thin film composed of active material that has the capability to store and release lithium either electrochemically or chemically and deposited on the current collector, the current collector comprises a copper alloy and has a tensile strength of 400 N/mm² or higher, a proportional limit of 160 N/mm² or higher, an elastic coefficient of 1.1 N/mm² or higher and a surface roughness Ra of 0.01–1 μm at its surface that carries the thin film of active material thereon.

8 Claims, 3 Drawing Sheets

ELECTRODE FOR RECHARGEABLE LITHIUM BATTERY AND RECHARGEABLE LITHIUM BATTERY

BACKGROUND OF THE INVENTION

1. Filed of the Invention

The present invention relates to an electrode for a rechargeable lithium battery and a rechargeable lithium battery utilizing the same.

2. Description of Related Art

Recently, rechargeable lithium batteries have been extensively developed. Such rechargeable lithium batteries exhibit battery characteristics, such as charge-discharge voltage, charge-discharge cycle life characteristics and storage characteristics, which depend largely upon the types of the electrode active materials used.

The use of lithium metal as the negative active material enables construction of batteries which exhibit high energy densities, both per weight and per volume. However, the lithium deposited on charge grows into dendrite, which could cause problematic internal short-circuiting (Solid State Ionics, 113–115, p 57(1998)).

On the other hand, rechargeable lithium batteries are reported using an electrode composed of aluminum, silicon, tin or the like which alloys electrochemically with lithium during charge (Japanese Patent Laid-Open No. Hei 10-255768).

However, since these active materials which store lithium via alloying expand and shrink in volume as they store and release lithium, they are pulverized during charge and discharge or caused to separate from the current collector. This results in the failure to obtain satisfactory charge-discharge cycle characteristics, which has been a problem.

An electrode, for a rechargeable lithium battery, which incorporates a noncrystalline or microcrystalline silicon thin film deposited on a copper foil or other current collector by a CVD or sputtering technique has been reported to exhibit satisfactory charge-discharge cycle characteristics because of good adhesion of the thin film of active material to the current collector (International Publication No. WO 01/31720A1 etc.).

However, in such an electrode for a rechargeable lithium battery, due to the improved adhesion between the current collector and the thin film of active material, a large stress is produced in the current collector as the thin film of active material expands and shrinks during charge and discharge. This occasionally results in the occurrence of deformation, such as wrinkle formation in the current collector. As the current collector undergoes wrinkling or other type of deformation, a proportion of a battery volume that is occupied by the electrode when housed in the battery increases. As a result, an energy density per volume of the battery is problematically reduced.

SUMMARY OF THE INVENTION

It is a first object of the present invention to provide an electrode for a rechargeable lithium battery, which can prevent the occurrence of wrinkling or other type of deformation in a current collector during charge and discharge and improve an energy density per volume of the rechargeable lithium battery, and also provide a rechargeable lithium battery using the same.

It is a second object of the present invention to provide an electrode for a rechargeable lithium battery, which incorporates a thin film of active material deposited on a current collector and exhibits improved charge-discharge cycle characteristics, and also provide a rechargeable lithium battery using the same.

The electrode for a rechargeable lithium battery, in accordance with the first aspect of the present invention, has a thin film composed of active material that stores and releases lithium either electrochemically or chemically and deposited on a current collector. Characteristically, the current collector comprises a copper alloy and has a tensile strength of 400 $N/mm^2$ or higher, a proportional limit of 160 $N/mm^2$ or higher, an elastic coefficient of 1.1 $N/mm^2$ or higher and a surface roughness Ra of 0.01–1 μm at its surface that carries the thin film of active material thereon.

In accordance with the first aspect, the current collector is used which comprises a copper alloy having a tensile strength of 400 $N/mm^2$ or higher, a proportional limit of 160 $N/mm^2$ or higher and an elastic coefficient of 1.1 $N/mm^2$ or higher. Accordingly, the current collector is hardly susceptible to deformation, such as wrinkling, even if subjected to a stress caused by expansion and shrinkage of the thin film of active material as it stores and releases lithium during charge and discharge. In the first aspect, the current collector preferably has a tensile strength of 480 $N/mm^2$ or higher, a proportional limit of 162 $N/mm^2$ or higher and an elastic coefficient of 1.15 $N/mm^2$ or higher.

The tensile strength, proportional limit and elastic coefficient can be determined, for example, by using an Instron 5566 universal tester from Instron Corporation.

The electrode for a rechargeable lithium battery, in accordance with the second aspect of the present invention, has a thin film composed of active material that stores and releases lithium either electrochemically or chemically and deposited on a current collector. Characteristically, the current collector comprises a Cu—Ni—Si or Cu—Cr—Zr alloy and has a surface roughness Ra of 0.01–1 μm at its surface that carries the thin film of active material thereon.

Illustrative of the Cu—Ni—Si alloy is a Corson alloy. The Corson alloy is an age-hardening alloy containing an $Ni_2Si$ phase as its precipitation phase and is regarded as a Cu—$Ni_2Si$ pseudobinary system. Because of its high tensile strength, proportional limit and elastic modulus, the Corson alloy can also be used as a material for the current collector in the first aspect. Examples of Corson alloys are Cu—Ni—Si alloys which contain 1.0–4.0% by weight of Ni and 0.1–1.0% by weight of Si. These alloys may further contain 0.05–0.3% by weight of Mg, 0.05–5.0% by weight of Zn, up to 5.0% by weight of Sn and less than 0.1% by weight of P, if necessary.

Illustrative Cu—Cr—Zr alloys contain 0.05–0.5% by weight of Cr and 0.01–0.3% by weight of Zr. These alloys may further contain 0.01–0.3% by weight of Mg, 0.05–5.0% by weight of Zn, up to 5.0% by weight of Sn and less than 0.1% by weight of P, if necessary.

The use of the Cu—Ni—Si or Cu—Cr—Zr alloy for the current collector, in accordance with the second aspect, prevents the occurrence of wrinkling or other type of deformation in the current collector and increases an energy density per volume of the rechargeable lithium battery.

In the first and second aspects of the present invention, the current collector is used which has a surface roughness Ra of 0.01–1 μm at its surface that carries the thin film of active material thereon. The use of the current collector having such a surface roughness Ra value improves adhesion thereof to the thin film of active material. The surface roughness Ra is defined in Japan Industrial Standards (JIS B 0601-1994) and can be determined by a surface roughness meter, for example.

The deposition of the thin film of active material on the current collector having the above-specified surface roughness Ra results in the provision of irregularities on a surface of the thin film, which correspond to those defined on the current collector surface. The provision of such irregularities on the surface of the thin film of active material increases the possibility that gaps are formed in its regions that extend in a thickness direction from valleys of the irregularities on the current collector surface toward valleys of the irregularities on the surface of the thin film of active material. Expansion and shrinkage of the thin film of active material, generally on or after the first charge-discharge cycle, causes formation of the gaps. The formation of such gaps along the thickness direction is followed by the division of the thin film of active material into columns along these gaps. The division of the thin film of active material into columns results in the provision of spaces that surround the columnar portions. These spaces can accommodate changes in volume of the thin film of active material as it expands and shrinks during charge-discharge cycles. This enables relaxation of a stress produced by expansion and shrinkage of the thin film during the charge-discharge cycles and prevents pulverization and separation of the thin film of active material from the current collector, resulting in obtaining improved charge-discharge cycle characteristics.

In the first and second aspects of the present invention, it is preferred that a component of the current collector is diffused into the thin film of active material. The diffusion of the current collector component into the thin film of active material improves adhesion between the current collector and the thin film of active material. In the case where the diffused current collector component is an element that does not alloy with lithium, such as copper, alloying of the active material with lithium is suppressed in the diffusion regions. This effectively suppresses expansion and shrinkage of the thin film during a charge-discharge reaction and prevents production of such a large stress that causes separation of the thin film of active material from the current collector.

The current collector may be subjected to a surface roughening treatment to control its surface roughness Ra within the range of with 0.01–1 μm. Such a surface roughening treatment can be made by such a technique as plating, vapor growth, etching or polishing. The plating and vapor growth are techniques for providing a rough surface by depositing a thin film having surface irregularities on a substrate made of a copper, Cu—Ni—Si or Cu—Cr—Zr alloy. Examples of plating techniques include electroplating and electroless plating. Examples of vapor growth techniques include sputtering, CVD, vapor evaporation.

Where a plating technique is utilized, surface roughening may be achieved by plating a film composed chiefly of copper, such as a copper or copper-zinc alloy film, on a substrate made of a copper alloy, Cu—Ni—Si alloy or Cu—Cr—Zr alloy, for example.

Where an electrolytic plating technique is utilized, surface roughening may preferably be achieved by a process, such as disclosed in Japanese Patent Publication No. Sho 53-39376, which is generally applied to a printed circuit copper foil, for example. In accordance with this surface roughening process, so-called "burning plating" is effected to form a particulate copper deposit, followed by "covering plating" that forms a substantially smooth deposit on the particulate copper deposit, while maintaining its irregular surface profile, so that the particulate copper deposit is rendered into a nodular copper deposit.

Where a vapor growth technique is utilized, surface roughening may be achieved by depositing a thin film chiefly of copper, such as a copper or copper-zinc alloy thin film, on a substrate by a sputtering or CVD process, for example.

Where an etching technique is utilized, surface roughening may be carried out by physical or chemical etching. Where a polishing technique is utilized, surface roughening may be achieved by a blasting process or with a sand paper, for example.

The electrode for a rechargeable lithium battery, in accordance with the third aspect of the present invention, has a thin film composed of active material that stores and releases lithium either electrochemically or chemically and deposited on a current collector. Characteristically, the current collector comprises a metal foil obtained by subjecting a metal foil to a plating treatment whereby a particulate copper deposit is formed on a surface of the metal foil and then to a plating treatment whereby a dense copper layer is formed in such a manner as to cover the particulate copper deposit while maintaining an irregular surface profile imparted by the particulate copper deposit.

In the third aspect, the so-called burning plating that provides the particulate copper deposit on a surface of the metal foil is followed by the so-called covering plating that provides the dense copper layer over the particulate copper deposit. This sequence of burning plating and covering plating is a technique known to be useful for roughening a surface of a printed circuit copper foil, and is disclosed, for example, in Japanese Patent Publication No. Sho 53-39376. The burning plating is carried out at a current level that gives a marginal current density to provide a particulate copper deposit. The covering plating is carried out at a current level that gives a marginal or lower current density to provide a dense copper layer in such a manner as to cover the particulate copper deposit.

FIG. 5 is a schematic sectional view given to illustrate a plated film formed by the sequence of burning plating and covering plating. As shown in FIG. 5, a particulate copper deposit 12 is formed on a metal foil 11 by burning plating. Subsequently, the covering plating is carried out to form a copper layer 13 in such a manner as to cover the particulate copper deposit 12. As such, the sequence of burning plating and covering plating results in the formation of large irregularities on a surface of the metal foil 11.

The current collector roughened at its surface by the sequence of burning and covering plating treatments preferably has a surface roughness Ry of 1 μm or greater. The surface roughness Ry is defined in Japan Industrial Standards (JIS B 0601-2001) and can be determined by a surface roughness meter, for example. An upper limit of the surface roughness Ry is not particularly specified. However, the surface roughness Ry if results from the sequence of burning plating and covering plating is estimated as being up to about 13 μm or up to about 8 μm. Accordingly, the current collector for use in the present invention preferably has a surface roughness Ry in the range of 1–13 μm, more preferably in the range of 1–8 μm.

In the third aspect, it is preferred that a component introduced into a surface portion of the current collector by said plating treatment is diffused into the thin film of active material. Since the particulate copper deposit and overlying copper deposit define the surface portion of the current collector, the surface component of the current collector is specified as being copper. The diffusion of the surface component, i.e., copper into the thin film of active material improves adhesion of the current collector to the thin film of active material. Since copper is an element that does not alloy with lithium, its diffusion into the thin film of active material suppresses alloying thereof with lithium in the diffused regions. This effectively suppresses expansion and shrinkage of the thin film during a charge-discharge reaction and prevents production of such a large stress that causes separation of the thin film of active material from the current collector. Also from this point of view, the adhesion between the current collector and the thin film of active material can be improved.

In the third aspect, it is preferred that the thin film of active material is divided into columns by gaps formed therein in a manner to extend in its thickness direction and the columnar portions are at their bottoms adhered to the current collector. As a result of formation of such gaps that extend in the thickness direction and succeeding division of the thin film into columns, spaces are provided which surround the columnar portions. These spaces now defined to surround the columnar portions can accommodate changes in volume of the thin film of active material as it expands and shrinks during charge-discharge cycles. This enables relaxation of a stress produced by expansion and shrinkage of the thin film during the charge-discharge cycles and thus prevents pulverization of the thin film of active material and separation thereof from the current collector, resulting in obtaining improved charge-discharge cycle characteristics.

The formation of such gaps that extend in the thickness direction of the thin film of active material is inducible by deposition of the thin film of active material on the current collector having irregularities on its surface. That is, when the thin film of active material is deposited on the current collector having surface irregularities, the corresponding irregularities can be formed on a surface of the thin film of active material. The provision of such irregularities on the surface of the thin film of active material facilitates formation of the gaps in its regions that extend in the thickness direction from valleys of the irregularities on the current collector surface toward valleys of the irregularities on the surface of the thin film of active material. Expansion and shrinkage of the thin film of active material, generally on or after the first charge-discharge cycle, causes formation of the gaps. Such gaps when formed to extend in the thickness direction, as stated above, divide the thin film of active material into columns.

In the third aspect, the metal foil for use as the current collector is not particularly specified in type, so long as it is useful for an electrode of a rechargeable lithium battery. Such a metal foil may be formed of at least one selected from copper, copper alloy, nickel, nickel alloy, iron, iron alloy, stainless steel, molybdenum, tantalum and tungsten. The metal foil may have a surface coated with copper or its alloy. Coating of copper or its alloy can be achieved by such a technique as plating, CVD, sputtering, vapor evaporation or spraying. When a plating technique is utilized to provide the copper or copper alloy coating, such a plating treatment precedes the burning plating treatment that provides a particulate copper deposit. That is, in the present invention, the metal foil may be subjected to a plating treatment other than the burning and covering plating treatments.

In the third aspect, thin films of active material may be deposited on both surfaces of the current collector. In such a case, both surfaces of the metal foil may preferably be subjected to the sequence of burning and covering plating treatments.

The matters common to the first, second and third aspects are hereinafter referred to as those of the "present invention".

In the present invention, the thin film of active material is a thin film that stores and releases lithium. Preferably, the active material has the ability to store lithium via alloying therewith. Examples of such active materials include silicon, germanium, tin, lead, zinc, magnesium, sodium, aluminum, potassium and indium. The use of silicon, germanium and tin, among these materials, is particularly preferred for their high theoretical capacities. Preferably, the thin film of active material for use in the present invention is comprised chiefly of silicon, germanium or tin. A silicon thin film is particularly preferred.

Also in the present invention, it is preferred that the thin film of active material is an amorphous or microcrystalline thin film. Accordingly, it is particularly preferred that the thin film of active material is an amorphous or microcrystalline silicon thin film.

In the present invention, the thin film of active material can be deposited by a CVD, sputtering, vapor evaporation, spraying or plating process. Preferred among them is a CVD or sputtering process.

In the present invention, the current collector preferably has a small thickness dimension, preferably in the form of a metal foil. The thin film of active material can be deposited on one or both surfaces of the current collector. In the latter case, the current collector preferably has a surface roughness Ra of 0.01–1 μm at each surface.

Lithium may be previously stored in or added to the thin film of active material in the present invention. Lithium may be added during deposition of the thin film of active material. That is, a lithium-containing active material may be deposited to introduce lithium into the resulting thin film of active material. Alternatively, lithium may be added or stored after deposition of the thin film of active material. One possible method is to use an electrochemical mechanism whereby lithium is stored in or added to the thin film.

The rechargeable lithium battery of the present invention is characterized as including a negative electrode comprised of the above-described electrode of the present invention, a positive electrode using a substance that stores and release lithium for its active material, and a nonaqueous electrolyte.

The nonaqueous electrolyte for use in the rechargeable lithium battery of the present invention is an electrolyte which contains a solute dissolved in a solvent.

The nonaqueous electrolyte solvent is not particularly specified in type, so long as it is useful for rechargeable lithium batteries. Examples of such nonaqueous electrolyte solvents include cyclic carbonates such as ethylene carbonate, propylene carbonate, butylene carbonate and vinylene carbonate and chain carbonates such as dimethyl carbonate, diethyl carbonate and methyl ethyl carbonate. Preferred is a mixed solvent of cyclic carbonate and chain carbonate. Also useful is a mixed solvent of any of the above-listed cyclic carbonates either with an ether solvent such as 1,2-dimethoxyethane or 1,2-diethoxyethane or with a chain ester such as γ-butyrolactone, sulfolane or methyl acetate.

The nonaqueous electrolyte solute is not particularly specified in type, so long as it is useful for rechargeable lithium batteries. Examples of nonaqueous electrolyte solutes include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiAsF_6$, $LiClO_4$, $Li_2B_{10}Cl_{10}$ and $Li_2B_{12}Cl_{12}$. Particularly preferred for use is a mixed solute of $LiXF_y$ (wherein X is P, As, Sb, B, Bi, Al, Ga or In; and y is 6 if X is P, As or Sb and y is 4 if X is B, Bi, Al, Ga or In) either with lithium perfluoroalkylsulfonimide $LiN(C_mF_{2m+1}SO_2)(C_nF_{2n+1}SO_2)$ (wherein m and n are independent integers of 1–4) or with lithium perfluoroalkylsulfonmethide $LiC(C_pF_{2p+1}SO_2)$ $(C_qF_{2q+1}SO_2)(C_rF_{2r+1}SO_2)$ (wherein p, q and r are independent integers of 1–4). Particularly preferred among them is a mixed solute of $LiPF_6$ and $LiN(C_2F_5SO_2)_2$.

Other useful nonaqueous electrolytes include gelled polymer electrolytes comprised of an electrolyte solution impregnated into polymer electrolytes such as polyethylene oxide, polyacrylonitrile and polyvinylidene fluoride; and inorganic solid electrolytes such as LiI and $Li_3N$, for example.

The electrolyte for the rechargeable lithium battery of the present invention can be used without limitation, so long as an Li compound as its solute that imparts an ionic conductivity, together with its solvent that dissolves and retains the Li compound, remain undecomposed at voltages during charge, discharge and storage of the battery.

Examples of useful active materials for the positive electrode of the rechargeable lithium battery of the present invention include lithium-containing transition metal oxides such as $LiCoO_2$, $LiNiO_2$, $LiMn_2O_4$, $LiMnO_2$, $LiCo_{0.5}Ni_{0.5}O_2$ and $LiNi_{0.7}Co_{0.2}Mn_{0.1}O_2$; and lithium-free metal oxides such as $MnO_2$. Other substances can also be used, without limitation, if they are capable of electrochemical lithium insertion and deinsertion.

Further, copper plating (covering plating) was carried out to form a dense copper deposit on the particulate copper deposit. As a result, a surface-roughened copper alloy foil with enhanced adhesion between the particulate copper deposit and the Corson alloy foil was fabricated. This foil was designated as a current collector a1.

Next, a Cu—Cr—Zr—Mg alloy foil was subjected to the same treatments as used in the fabrication of the current collector a1, i.e., subjected to the sequence of burning and covering plating treatments to fabricate a current collector a2.

The thickness, tensile strength, proportional limit, elastic coefficient and surface roughness Ra, measured for each of the current collectors a1 and a2, are listed in Table 1.

In Table 1, the thickness is given by a value measured by a micrometer. The tensile strength, proportional limit and elastic coefficient are given by values determined using an Instron 5566 universal tester from Instron Corporation. The surface roughness Ra is given by a value measured by a surface roughness meter.

TABLE 1

| Current Collector | Substrate | Thickness (μm) | Tensile Strength (N/mm$^2$) | Proportional Limit (N/mm$^2$) | Elastic Coefficient (×10$^5$N/mm$^2$) | Surface Roughness Ra (μm) |
|---|---|---|---|---|---|---|
| a1 | Corson Alloy | 24.7 | 520 | 165 | 1.2 | 0.43 |
| a2 | Cu—Cr—Zr—Mg Alloy | 24.0 | 535 | 175 | 1.3 | 0.50 |

DESCRIPTION OF THE PREFERRED EXAMPLES

The present invention is now described in more detail with reference to examples. It will be recognized that the following examples merely illustrate the practice of the present invention but are not intended to be limiting thereof. Suitable changes and modifications can be effected without departing from the scope of the present invention.

Experiment 1

EXAMPLES 1 AND 2

(Fabrication of Working Electrodes)

Burning copper plating was carried out electrolytically to form a particulate copper deposit on a Corson alloy foil.

Then, an active material for a negative electrode, i.e., a silicon thin film was formed on each of the current collectors a1 and a2 by an RF sputtering technique. The sputtering was achieved using argon (Ar) as a sputter gas, at a sputter gas flow rate of 100 sccm, an ambient substrate temperature (not heated), a reaction pressure of 0.133 Pa ($1.0 \times 10^{-3}$ Torr) and 200 W RF power. Deposition of the silicon thin film was continued until it reached a thickness of about 5.5 μm.

The resulting silicon thin film was analyzed by Raman spectroscopy which revealed the presence of a peak around 480 cm$^{-1}$ and the absence of a peak around 520 cm$^{-1}$. This analysis proved an amorphous nature of the silicon thin film.

The silicon thin film deposited on each current collector was cut into a 2 cm×2 cm size. After attachment of a nickel lead wire, each piece was dried under vacuum at 100° C. for 2 hours to provide a working electrode of Example 1 (current collector a1) or Example 2 (current collector a2)

(Construction of Beaker Cells)

Figure 4:
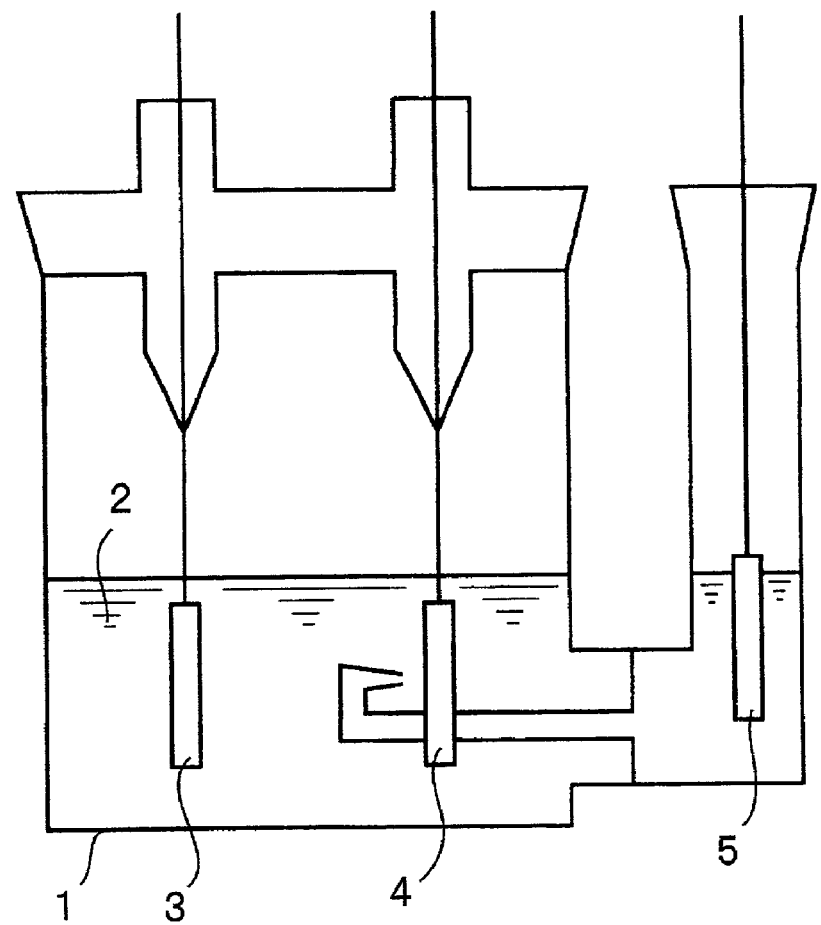
FIG. 4 is a schematic constitutional view which shows a three-electrode beaker cell.
Figure 5:
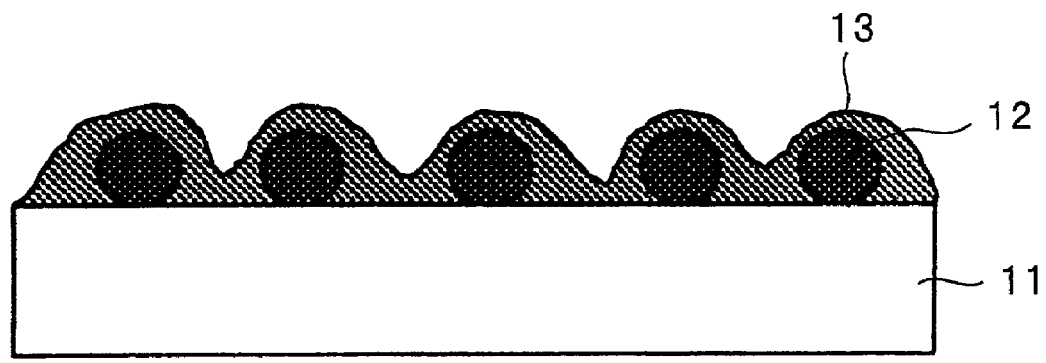
FIG. 5 is a sectional view which schematically shows an electrode for a rechargeable lithium battery in accordance with the third aspect of the present invention.

Using each of the above-fabricated working electrodes, a three-electrode beaker cell, as illustrated in FIG. 4, was constructed under argon gas atmosphere in a glove box. As illustrated in FIG. 4, the beaker cell includes a counter electrode 3, a working electrode 4 and a reference electrode 5, with all being immersed in an electrolyte solution 2 contained in a container 1. The electrolyte solution 2 was prepared by dissolving 1 mole/liter of $LiPF_6$ in a mixed solvent containing ethylene carbonate and diethyl carbonate at a 3:7 ratio by volume. Lithium metal was used to constitute each of the counter electrode 3 and the reference electrode 5.

(Evaluation of Charge-Discharge Cycle Characteristics)

The above-constructed beaker cell was charged at 25° C. at a constant current of 4 mA until a potential of the working electrode reached 0 V (vs. Li/Li$^+$) and then discharged at a constant current of 4 mA until the working electrode potential reached 2 V (vs. Li/Li$^+$) to evaluate a discharge capacity per unit area and a charge-discharge efficiency on the initial cycle. The initial-cycle charge-discharge efficiency (initial charge-discharge efficiency) is calculated from the following equation:

Initial charge-discharge efficiency (%)=Initial discharge capacity÷Initial charge capacity×100

The evaluation results are listed in Table 3.

(Evaluation of Electrode Thickness)

Thickness of each working electrode before and after charge-discharge testing was measured using a micrometer to determine a difference between thickness before and after the charge-discharge testing. Thickness was measured at a center and four edges of the electrode, i.e., at five points in all, and an arithmetic mean of the values obtained was recorded as the thickness of the electrode. The evaluation results are given in Table 4.

Comparative Examples 1 and 2

An electrolytic copper foil having physical properties listed in Table 2 was used as a current collector b1. A rolled copper foil (surface roughness Ra=0.1 μm) was roughened at its surface by the electrolytic plating treatment as described in Example 1 to provide a current collector b2. The thickness, tensile strength, proportional limit, elastic coefficient and surface roughness Ra, measured for each of the current collectors b1 and b2, are listed in Table 2.

TABLE 2

| Current Collector | Substrate | Thickness (μm) | Tensile Strength (N/mm$^2$) | Proportional Limit (N/mm$^2$) | Elastic Coefficient (×10$^5$N/mm$^2$) | Surface Roughness Ra (μm) |
|---|---|---|---|---|---|---|
| b1 | Electrolytic Copper Foil | 25.2 | 280 | 155 | 1.0 | 0.52 |
| b2 | Rolled Copper Foil | 25.4 | 250 | 115 | 1.0 | 0.65 |

An amorphous silicon thin film was deposited on the current collectors b1 and b2 in the same manner as in Examples 1 and 2, followed by the procedure used in Examples 1 and 2 that resulted in the fabrication of a working electrode of Comparative Example 1 (current collector b1) and a working electrode of Comparative Example 2 (current collector b2).

Using these working electrodes, beaker cells were constructed in the same manner as in Examples 1 and 2. An initial discharge capacity and an initial charge-discharge efficiency of each beaker cell was measured. The measurement results are given in Table 3.

TABLE 3

| Working Electrode | Initial Discharge Capacity (mAh/cm$^2$) | Initial Charge-Discharge Efficiency (%) |
|---|---|---|
| Ex. 1 | 3.83 | 94.8 |
| Ex. 2 | 3.67 | 95.5 |
| Comp. Ex. 1 | 3.48 | 94.4 |
| Comp. Ex. 2 | 3.67 | 94.0 |

As can be seen from the results shown in Table 3, the electrodes of Examples 1 and 2 and Comparative Examples 1 and 2 all exhibit discharge capacities around 3.5 mAh/cm$^2$ and initial charge-discharge efficiencies of 94% and higher. This is probably because each current collector has a rough surface and the thin film of active material deposited thereon is divided into columns by the gaps formed therein in a manner to extend in its thickness direction, so that the thin film of active material is kept adherent to the current collector without being separated or pulverized.

As similar to the electrodes of Examples 1 and 2, the electrodes of Comparative Examples 1 and 2 were measured for thickness. That is, thickness of each electrode was measured both before and after the charge-discharge testing to calculate a difference between thickness before and after the charge-discharge testing. The results are shown in Table 4.

TABLE 4

| Working Electrode | Thickness Before Charge-Discharge Testing (μm) | Thickness After Charge-Discharge Testing (μm) | Difference Between Thickness Before and After Charge-Discharge Testing (μm) |
|---|---|---|---|
| Ex. 1 | 30.2 | 37.2 | 6.8 |
| Ex. 2 | 30.1 | 40.8 | 10.7 |
| Comp. Ex. 1 | 30.7 | 252.7 | 222 |
| Comp. Ex. 2 | 30.9 | 273.9 | 243 |

As apparent from Table 4, the working electrodes of Examples 1 and 2 show considerably smaller differences between thickness before and after charge-discharge testing, compared to those of Comparative Examples 1 and 2. This is because the working electrodes of Examples 1 and 2 are little susceptible to deformation, such as wrinkling, even if they are subjected to charge-discharge testing.

Figure 1:
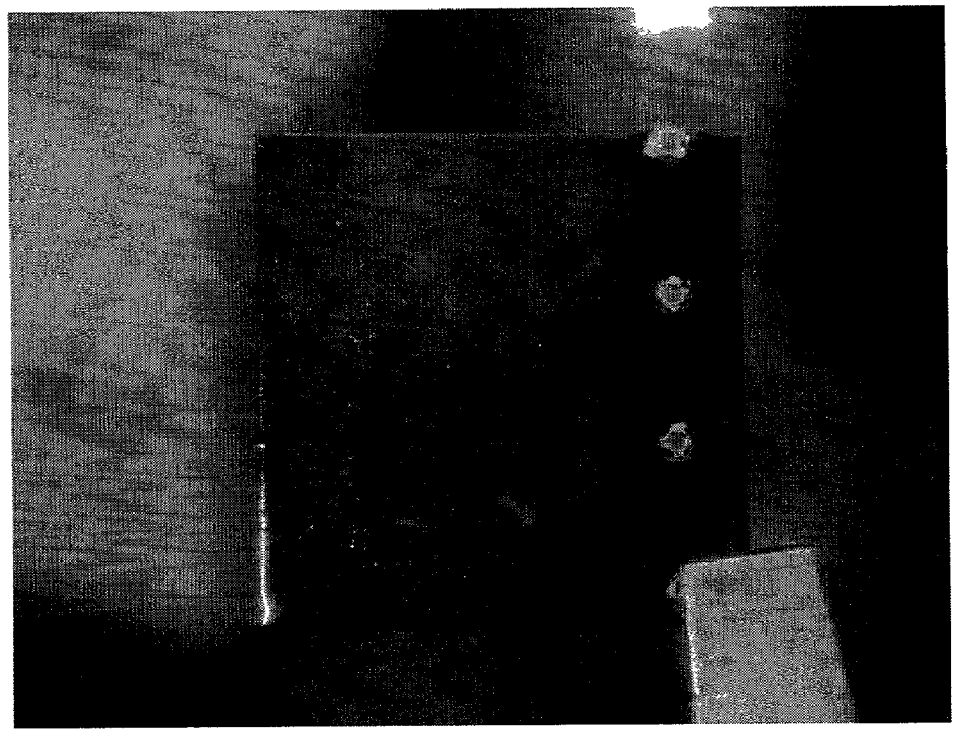
FIG. 1 shows the electrode of Example 1, in accordance with the present invention, in its condition after charge-discharge testing.
Figure 2:
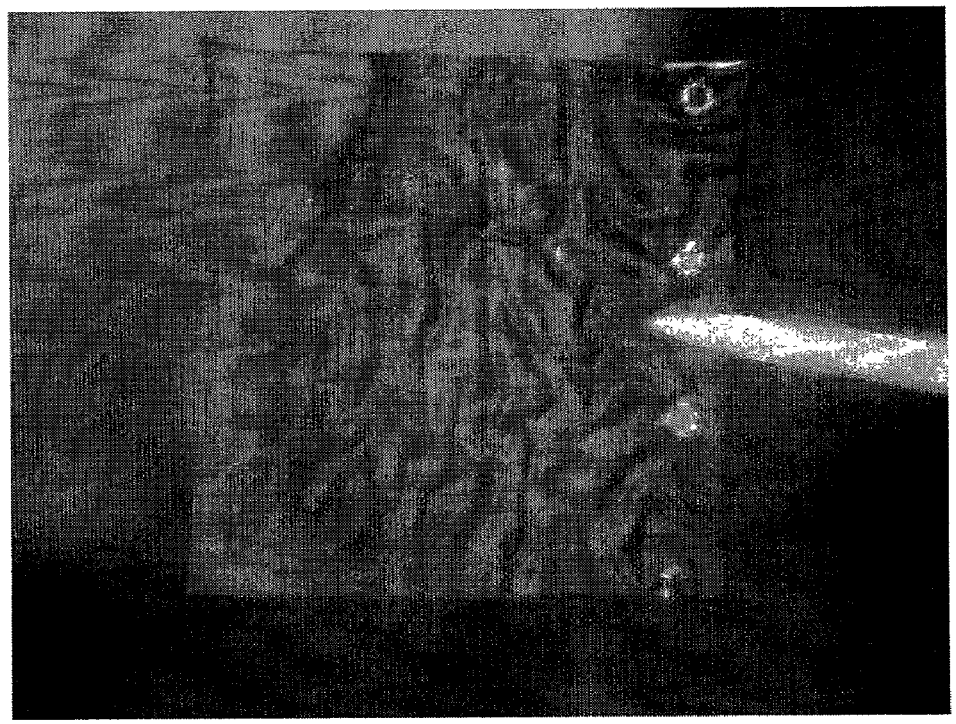
FIG. 2 shows the electrode of Comparative Example 1 in its condition after charge-discharge testing.
Figure 3:
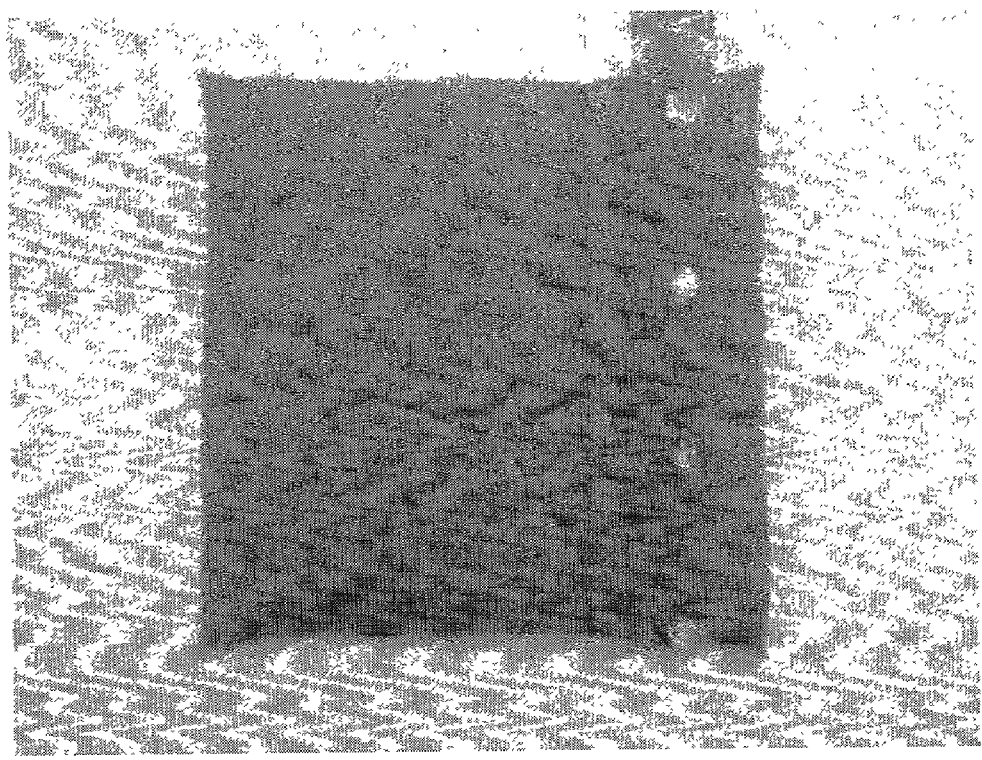
FIG. 3 shows the electrode of Comparative Example 2 in its condition after charge-discharge testing.

FIG. 1 shows the working electrode of Example 1 in its condition after charge-discharge testing. FIGS. 2 and 3 show the working electrodes of Comparative Examples 1 and 2 in their respective conditions after charge-discharge testing. As clearly seen from FIGS. 1–3, appreciable deformation, i.e., formation of a number of wrinkles, is observed in the working electrodes of Comparative Examples 1 and 2, while no appreciable deformation or wrinkling is observed in the working electrode of Example 1.

The preceding results demonstrate that a rechargeable lithium battery having a high energy density per volume can be obtained with the use of the electrode of Example 1.

Experiment 2

(Fabrication of Current Collectors)

(Current Collector c1)

A rolled copper foil (thickness of 18 μm) was subjected to a burning plating treatment using a copper sulfate plating solution sold in the market and then to a covering plating treatment to fabricate a current collector c1. The burning plating treatment was performed using a plating solution containing sulfuric acid and copper sulfate at a 20:7 ratio by weight, at a current density of 3 A/dm$^2$ for a duration of 3 minutes. After this burning plating treatment, the copper foil was washed with water and then subjected to the covering plating treatment. The covering plating treatment was carried out using a plating solution containing sulfuric acid and copper sulfate at a 1:4 ratio by weight, at a current density of 3 A/dm$^2$ for a duration of 15 seconds.

(Current Collector c2)

The procedure used to fabricate the current collector c1 was followed, except that the duration of the burning plating treatment was altered from 3 minutes to 2 minutes, to fabricate a current collector c2.

(Current Collector c3)

The procedure used to fabricate the current collector c1 was followed, except that the duration of the burning plating treatment was altered from 3 minutes to 4 minutes, to fabricate a current collector c3.

(Current Collector d1)

The procedure used to fabricate the current collector c1 was followed, except that the burning plating treatment alone was performed and the covering plating treatment was excluded, to fabricate a current collector d1.

(Current Collector d2)

The procedure used to fabricate the current collector c2 was followed, except that the burning plating treatment alone was performed and the covering plating treatment was excluded, to fabricate a current collector d2.

(Current Collector d3)

The procedure used to fabricate the current collector c3 was followed, except that the burning plating treatment alone was performed and the covering plating treatment was excluded, to fabricate a current collector d3.

(Current Collector e1)

Neither of the burning and covering plating treatments was performed and the rolled copper foil (thickness of 18 μm) substrate itself was used as a current collector e1.

Each of the above current collectors was measured for surface roughness Ry. The measurement results are given in Table 1.

(Fabrication of Working Electrodes)

An active material for a negative electrode, i.e., a silicon thin film was formed on each of the current collectors c1–c3, d1–d3 and e1 by an RF sputtering technique. The sputtering was achieved using argon (Ar) as a sputter gas, at a sputter gas flow rate of 100 sccm, an ambient substrate temperature (not heated), a reaction pressure of 0.133 Pa (1.0×10$^{-3}$ Torr) and 200 W RF power. Deposition of the silicon thin film was continued until it reached a thickness of about 5 μm.

The resulting silicon thin film was analyzed by Raman spectroscopy which revealed the presence of a peak around 480 cm$^{-1}$ and the absence of a peak around 520 cm$^{-1}$. This analysis proved an amorphous nature of the silicon thin film.

Each current collector with the silicon thin film deposited thereon was cut into a 2 cm×2 cm size. After attachment of a nickel lead wire, each piece was dried under vacuum at 110° C. for 2 hours to provide a working electrode. Those using the current collectors c1–c3 were designated as working electrodes C1–C3 and those using the current collectors d1–d3 as working electrodes D1–D3, respectively.

The one using the current collector e1 was designated as the working electrode E1.

(Construction of Beaker Cells)

Using each of the above-fabricated working electrodes, a three-electrode beaker cell was constructed in the same manner as in the above Experiment 1.

(Evaluation of Charge-Discharge Cycle Characteristics)

Each of the above-constructed beaker cells was charged at 25° C. at a constant current of 4 mA until a potential of the working electrode reached 0 V (vs. Li/Li$^+$) and then discharged at a constant current of 4 mA until the working electrode potential reached 2 V (vs. Li/Li$^+$). This unit cycle was repeated to measure 1st-cycle and 10th-cycle discharge capacities and calculate a capacity retention rate from the following equation:

Capacity retention rate (%)=10th-cycle discharge capacity÷1st-cycle discharge capacity×100

The evaluation results are listed in Table 5.

TABLE 5

| Working Electrode | Current Collector | Surface Roughness of Current Collector Ry (μm) | 1st-cycle Discharge Capacity (mAh/cm$^2$) | 10th-cycle Discharge Capacity (mAh/cm$^2$) | Capacity Retention Rate (%) |
|---|---|---|---|---|---|
| C1 | c1 | 4.67 | 12.7 | 12.4 | 96.4 |
| C2 | c2 | 3.47 | 13.0 | 11.9 | 92.1 |
| C3 | c3 | 8.32 | 12.7 | 11.9 | 93.8 |
| D1 | d1 | 5.45 | 10.3 | 7.43 | 72.2 |
| D2 | d2 | 3.49 | 11.8 | 7.46 | 63.3 |
| D3 | d3 | 8.08 | 9.08 | 6.21 | 68.5 |
| E1 | e1 | 0.67 | 2.92 | 0.24 | 8.00 |

As can be clearly seen from the results shown in Table 5, the working electrodes C1–C3 incorporating the respective current collectors c1–c3 fabricated by subjecting the rolled copper foil to the sequence of burning and covering plating treatments exhibit the increased capacity retention rates and improved charge-discharge cycle characteristics compared to the electrodes D1–D3 incorporating the respective current collectors d1–d3 fabricated by subjecting the rolled copper foil to the burning plating treatment alone. Also, they exhibit the markedly increased capacity retention rates compared to the working electrode E1 using the rolled copper foil itself as the current collector e1.

What is claimed is:

1. An electrode for a rechargeable lithium battery which includes a current collector and a thin film composed of active material that stores and releases lithium either electrochemically or chemically and formed on the current collector by a CVD, sputtering, vapor evaporation, spraying or plating process, wherein said current collector has irregularities on its surface and comprises a copper alloy and has a tensile strength of 400 N/mm$^2$ or higher, a proportional limit of 160 N/mm$^2$ or higher, an elastic coefficient of 1.1 N/mm$^2$ or higher and a surface roughness Ra of 0.01–1 μm at its surface that carries said thin film of active material thereon, and wherein said thin film of active material as formed on the current collector by the CVD, sputtering, vapor evaporation, spraying or plating process has on its surface irregularities corresponding to the irregularities of the current collector surface and is thereafter divided into columns by gaps formed therein in a manner to extend in its thickness direction from valleys of the irregularities on the current collector surface toward valleys of the irregularities on the thin film surface and form columnar portions and said columnar portions are at their bottoms adhered to the current collector, and wherein said thin film of active material is comprised chiefly of silicon, germanium or tin.

2. The electrode of claim 1, wherein said copper alloy is a Cu—Ni—Si alloy.

3. The electrode of claim 1, wherein said copper alloy is a Cu—Cr—Zr alloy.

4. The electrode of claim 1, wherein said surface of the current collector that carries said thin film of active material thereon is roughened by a plating, vapor growth, etching or polishing process.

5. The electrode of claim 4, wherein said surface roughening is achieved by providing a deposit comprised chiefly of copper by a plating process.

6. The electrode of claim 1, wherein a component of said current collector is diffused into said thin film of active material.

7. The electrode of claim 1, wherein said thin film is a microcrystalline or amorphous silicon thin film.

8. The electrode of claim 2, wherein said Cu—Ni—Si alloy is in the form of a metal foil.

* * * * *